(12) United States Patent
Nakatsukasa

(10) Patent No.: US 11,713,874 B2
(45) Date of Patent: Aug. 1, 2023

(54) SOUND COLLECTION DEVICE

(71) Applicant: YAMAHA CORPORATION, Hamamatsu (JP)

(72) Inventor: Hitoshi Nakatsukasa, Hamamatsu (JP)

(73) Assignee: YAMAHA CORPORATION, Hamamatsu (JP)

(*) Notice: Subject to any disclaimer, the term of this patent is extended or adjusted under 35 U.S.C. 154(b) by 171 days.

(21) Appl. No.: 17/160,849

(22) Filed: Jan. 28, 2021

(65) Prior Publication Data

US 2021/0148561 A1 May 20, 2021

Related U.S. Application Data

(62) Division of application No. 16/358,893, filed on Mar. 20, 2019, now Pat. No. 10,941,934.

(30) Foreign Application Priority Data

Mar. 23, 2018 (JP) ................ 2018-055557

(51) Int. Cl.
*G08B 5/00* (2006.01)
*F21V 33/00* (2006.01)
(Continued)

(52) U.S. Cl.
CPC ........ *F21V 33/0056* (2013.01); *G02B 6/0021* (2013.01); *G10L 25/51* (2013.01); *H04R 1/028* (2013.01)

(58) Field of Classification Search
CPC ............. F21V 33/0056; F21V 2200/20; G02B 6/0021; G02B 6/0068; G10L 25/51;
(Continued)

(56) References Cited

U.S. PATENT DOCUMENTS

| 5,546,496 A | 8/1996 | Kimoto |
|---|---|---|
| 6,334,688 B1 | 1/2002 | Niwa |

(Continued)

FOREIGN PATENT DOCUMENTS

| CN | 202209598 U | 5/2012 |
|---|---|---|
| CN | 102662527 A | 9/2012 |

(Continued)

OTHER PUBLICATIONS

Office Action issued in Japanese Appln. No. 2018-055557 dated May 17, 2022. English machine translation provided.

(Continued)

*Primary Examiner* — Anh V La
(74) *Attorney, Agent, or Firm* — Rossi, Kimms & McDowell LLP

(57) ABSTRACT

A light emission display device according to an aspect of the present invention includes: a light guide member that converts rays of incident light from a back face thereof to produce diffused light and emits the diffused light from the front face; a plurality of point light sources that are arranged at intervals on a side of the back face of the light guide member, in which the light guide member includes a light shield structure that partitions the front face into a plurality of light emission regions each corresponding to at least one point light source of the plurality of point light sources immediately below the front face, such that transmission of the rays of light to an adjacent light emission region is reduced.

8 Claims, 6 Drawing Sheets

(51) Int. Cl.
*G10L 25/51* (2013.01)
*H04R 1/02* (2006.01)
*F21V 8/00* (2006.01)

(58) Field of Classification Search
CPC ........ H04R 1/028; H04R 1/406; H04R 1/025;
H04R 1/403; H04R 1/08; H04R 23/008;
G01S 3/801; G01S 3/803
USPC .............. 340/815.42, 815.4, 815.43, 815.44,
340/815.45, 815.46
See application file for complete search history.

(56) References Cited

U.S. PATENT DOCUMENTS

| | | | |
|---|---|---|---|
| 8,279,078 B2 | 10/2012 | Hsu | |
| 9,659,719 B2 | 5/2017 | Chiba | |
| 9,721,586 B1 | 8/2017 | Bay | |
| 9,793,869 B1* | 10/2017 | Snyder | H04M 1/02 |
| 10,503,952 B2 | 12/2019 | Wang | |
| 10,941,934 B2* | 3/2021 | Nakatsukasa | G10L 25/51 |
| 2003/0118200 A1* | 6/2003 | Beaucoup | H04M 3/56 381/92 |
| 2005/0093970 A1* | 5/2005 | Abe | H04N 7/15 348/E7.083 |
| 2014/0037081 A1* | 2/2014 | Ishibashi | H04M 3/56 379/202.01 |
| 2015/0333237 A1 | 11/2015 | Facer | |
| 2016/0323668 A1* | 11/2016 | Abraham | H04R 1/02 |
| 2016/0377789 A1 | 12/2016 | Yang | |
| 2018/0045878 A1 | 2/2018 | Murata | |
| 2018/0167706 A1* | 6/2018 | Robison | H04R 1/2857 |

FOREIGN PATENT DOCUMENTS

| | | |
|---|---|---|
| CN | 104303247 A | 1/2015 |
| CN | 104347004 A | 2/2015 |
| CN | 106228144 A | 12/2016 |
| CN | 207083197 U | 3/2018 |
| JP | 2000207916 A | 7/2000 |
| JP | 2004233466 A | 8/2004 |
| JP | 2008042261 A | 2/2008 |
| JP | 2008154055 A | 7/2008 |
| JP | 2011060706 A | 3/2011 |
| WO | 2013168721 A1 | 11/2013 |

OTHER PUBLICATIONS

Office Action issued in Chinese Appln. No. 201910112550.5 dated Aug. 13, 2020. English translation provided.
Office Action issued in U.S. Appl. No. 16/358,893 dated May 26, 2020.
Notice of Allowance issued in U.S. Appl. No. 16/358,893 dated Nov. 16, 2020.
Office Action issued in Japanese Appln. No. 2018-055557 dated Dec. 21, 2021. English machine translation provided.
Office Action issued in Japanese Appln. No. 2022-024183 dated Jan. 10, 2023. English machine translation provided from the JPO One Portal Dossier.

* cited by examiner

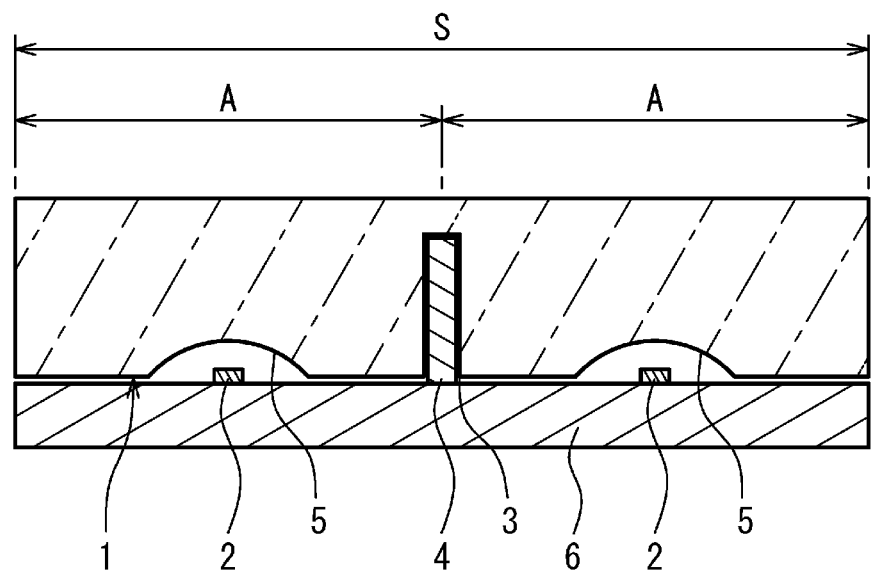
F I G. 1

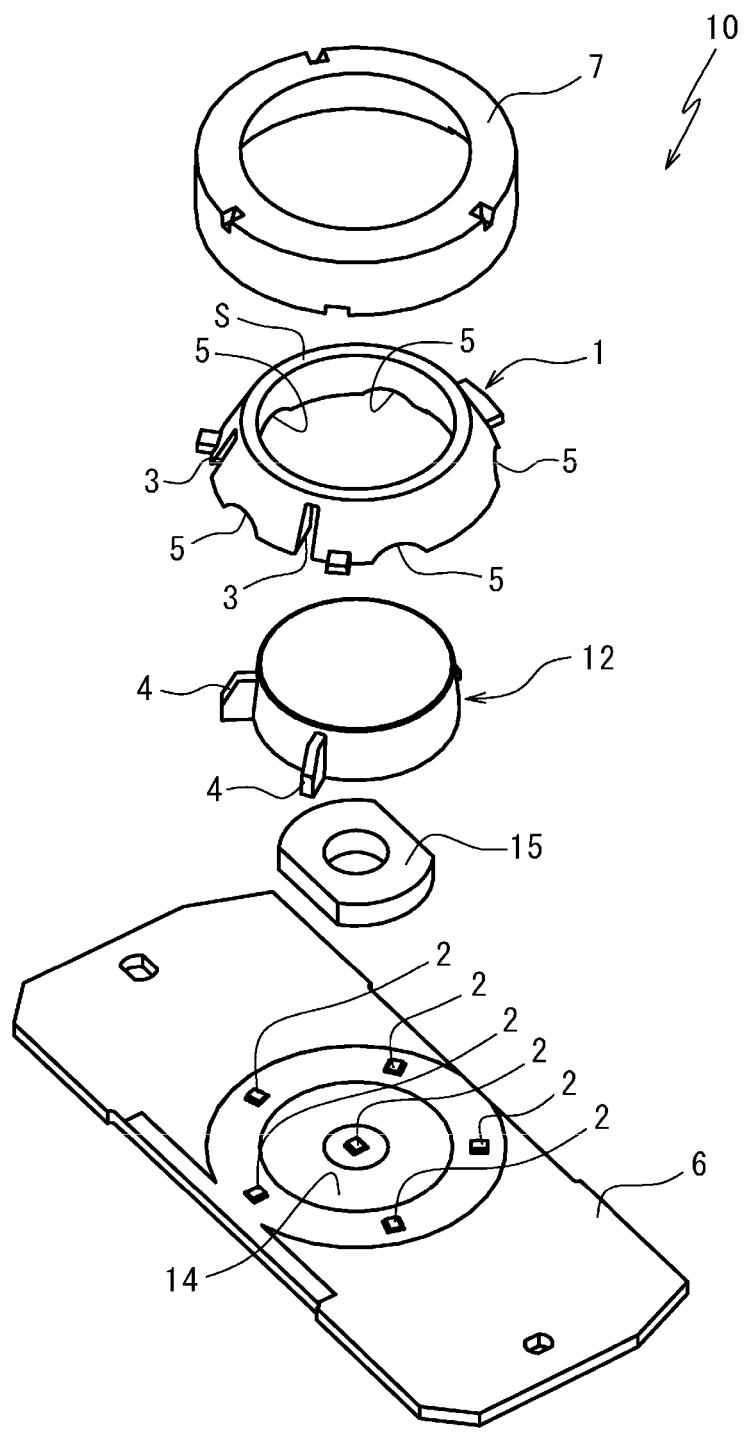
F I G. 3

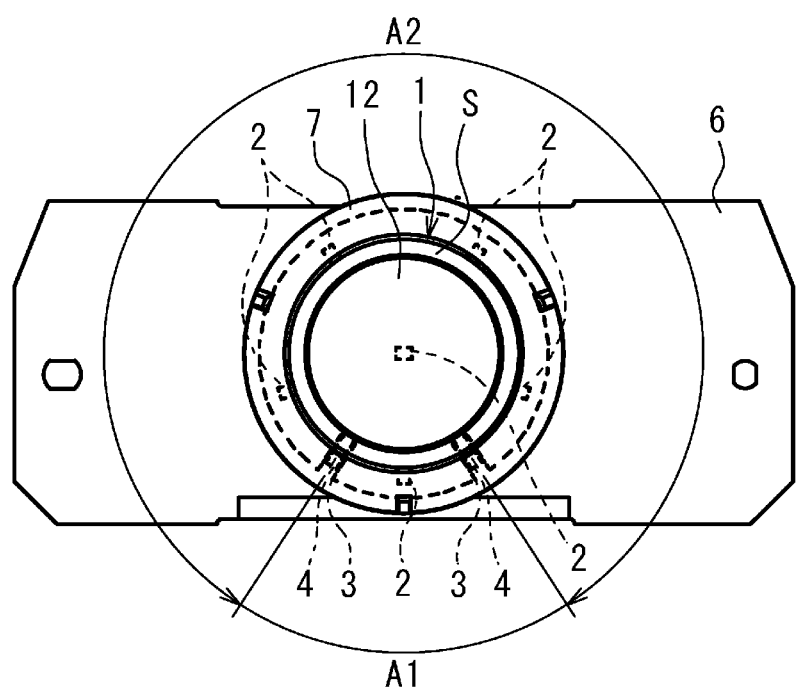
F I G. 4

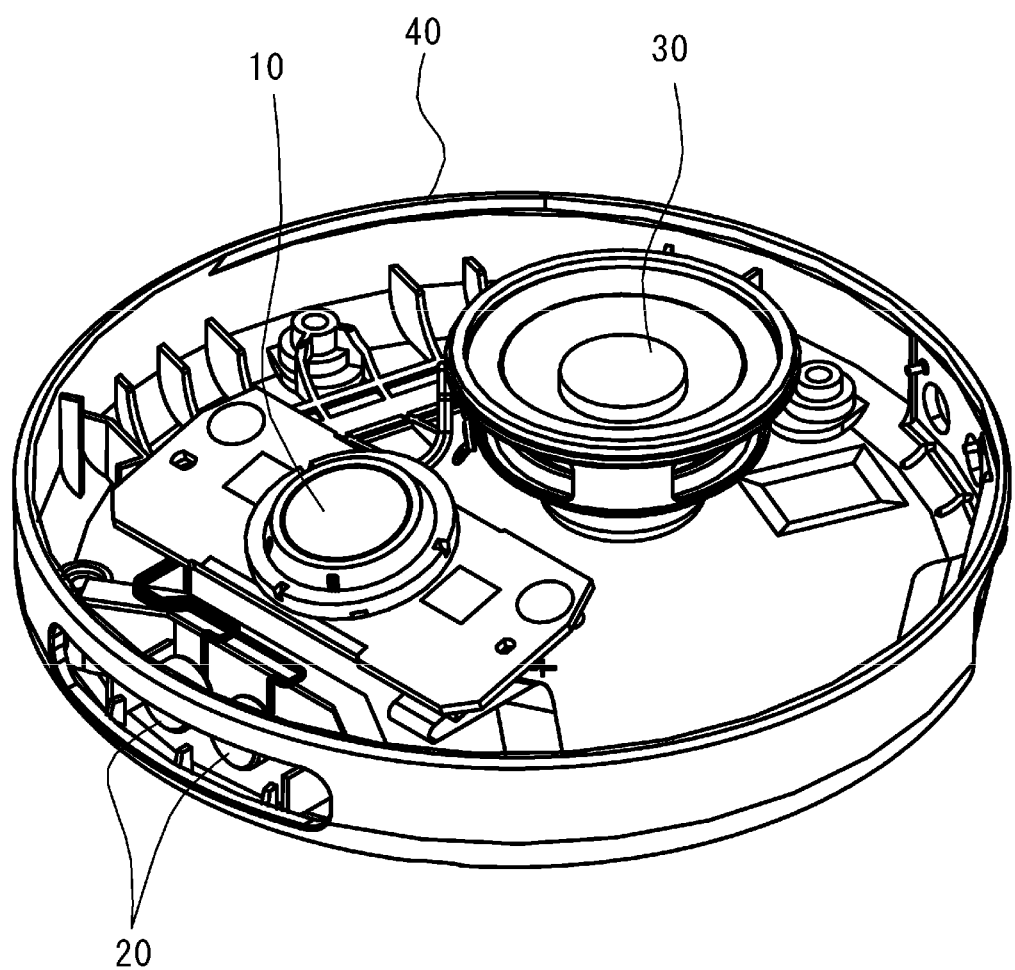
F I G. 6

SOUND COLLECTION DEVICE

BACKGROUND OF THE INVENTION

Field of the Invention

The present invention relates to a light emission display device, a light emission display switch, and a sound collection device.

Discussion of the Background

In some cases, a light emission display device capable of emitting light uniformly from a light emission face having a particular area and/or emitting light only from a partial region of the light emission face is required. Such a light emission display device is assumed to emit light only from a partial region of the light emission face by providing a plurality of light sources and lighting only a part of the plurality of light sources.

In the case of emitting light only from a partial region of the light emission face, it is often ideal that a boundary between the light emission region and an unlit region adjacent thereto is clear, in other words the luminance changes in a discontinuous manner at the boundary between the light emission region and the unlit region.

For example, Japanese Unexamined Patent Application, Publication No. 2011-60706 discloses a display device having: a plurality of LED light sources; a cone-shaped or bowl-shaped light shield partition wall provided to separate each of the plurality of LED light sources; a plurality of lenses that are provided above the partition wall and transform light emitted from the LED light source into upward parallel rays; and a diffuser panel that is provided to cover the plurality of lenses and diffuses the parallel rays exiting from the lenses.

In the display device disclosed in the aforementioned publication, since the lens is used to transform the light emitted from the LED light source into upward parallel rays, the lens has a complex shape. Thus, the lens causes a rise in the production cost.

A display device is employed in various instruments. A display device that displays a functional status etc. of a microphone is required in sound collection devices such as a sound input-output device for a teleconference system. For example, Japanese Unexamined Patent Application, Publication No. 2008-154055 discloses a video-conference device provided with a liquid crystal display panel as a display device.

However, with the liquid crystal display panel of the video-conference device disclosed in the aforementioned publication, easy visual recognition of a content displayed thereon is only possible from a front face of the device. Accordingly, with the video-conference device disclosed in the aforementioned publication, many of participants seated around the device cannot check a functional status of the device, for example whether a microphone is active or not.

PRIOR ART DOCUMENTS

Patent Documents

Patent Document 1: Japanese Unexamined Patent Application, Publication No. 2011-60706
Patent Document 2: Japanese Unexamined Patent Application, Publication No. 2008-154055

SUMMARY OF THE INVENTION

Problems to be Solved by the Invention

In view of the foregoing disadvantages, an exemplary object of the present invention is to provide a light emission display device and a light emission display switch that are inexpensive and have a clear boundary between a light emission region and an unlit region. Another exemplary object of the present invention is to provide a sound collection device whose functional status is easily recognized.

Means for Solving the Problems

A light emission display device according to one aspect of the present invention made for solving the aforementioned problems includes: a light guide member that converts rays of incident light from a first face thereof to produce diffused light and emits the diffused light from a second face thereof on an opposite side to the first face; and a plurality of point light sources that are arranged at intervals on a side of the first face of the light guide member, in which the light guide member comprises a light shield structure that partitions the second face into a plurality of light emission regions each corresponding to at least one point light source of the plurality of point light sources immediately below the second face, such that transmission of the rays of light from each light emission region to an adjacent light emission region is reduced.

A light emission display switch according to another aspect of the present invention made for solving the aforementioned problems includes: the light emission display device of the one embodiment of the invention provided with a light shield plate inserted into a slit of the light shield structure; an operation member operable by a user; and a detection mechanism that detects an operation of the operation member, in which: the light guide member has a cylindrical shape with both end faces being the first face and the second face; the operation member is provided inside the light guide member; and the light shield plate is provided on an outer periphery of the operation member.

A sound collection device according to still another aspect of the present invention made for solving the aforementioned problems includes: the light emission display switch; and a microphone whose functional status is determined in accordance with the operation of the operation member of the light emission display switch, and is configured such that the light emission region corresponding to the at least one point light source that is to be lit is selected in accordance with the functional status of the microphone.

A sound collection device according to yet another aspect of the present invention made for solving the aforementioned problems includes a microphone and a light emission display portion. The light emission display portion switches between a first display state in which an entirety of a light emission face emits light, and a second display state in which a part of the light emission face emits light, in accordance with a functional status of the microphone.

Effects of the Invention

The light emission display device according to the one aspect of the present invention is inexpensive, and has a clear boundary between a light emission region and an unlit region. In addition, in the sound collection device according to the still another aspect of the present invention, a functional status thereof is easily recognized.

BRIEF DESCRIPTION OF THE DRAWINGS

FIG. 1 is a schematic cross sectional view of a light emission display device according to an embodiment of the present invention;

FIG. 3 is a schematic exploded perspective view of the light emission display switch of FIG. 2;

FIG. 4 is a schematic plan view of the light emission display switch of FIG. 2;

FIG. 6 is a schematic perspective view of the sound collection device of FIG. 5 with an upper portion of a housing thereof being removed.

DESCRIPTION OF EMBODIMENTS

Figure 2:
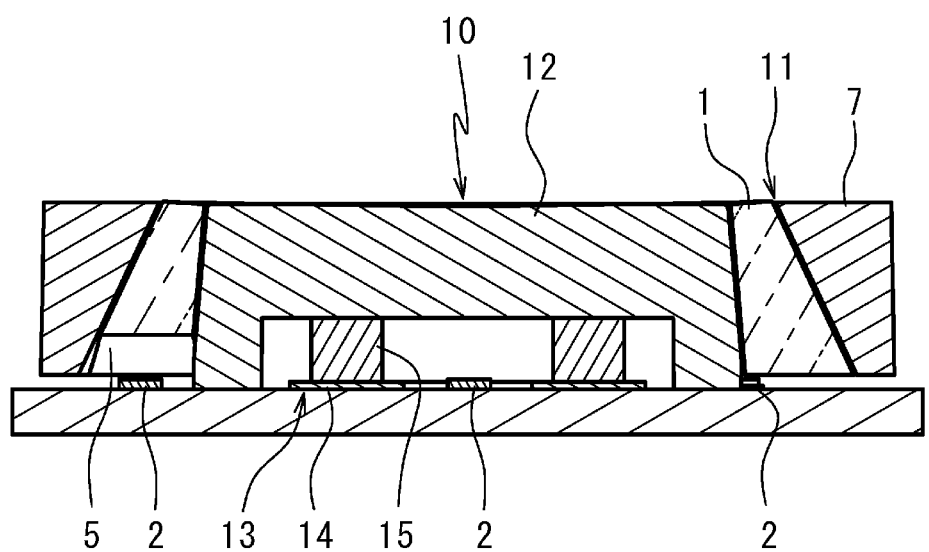
FIG. 2 is a schematic cross sectional view of a light emission display switch according to an embodiment of the present invention.

Embodiments of the present invention will be described in detail hereinafter, with appropriate reference to the drawings.

Light Emission Display Device

FIG. 1 shows a light emission display device according to an embodiment of the present invention. The light emission display device includes: a light guide member 1 that converts rays of incident light from a first face thereof to produce diffused light and emits the diffused light from a second face thereof on an opposite side to the first face; and a plurality of point light sources 2 that are arranged at intervals on a side of a back face of the light guide member 1. The "first face" as referred to means a face on a back side, and hereinafter may be also referred to as "back face". The "second face" as referred to means a face on a front side, and hereinafter may be also referred to as "front face" or "light emission face S".

It is to be noted that the "front face" and "back face" as referred to herein are on a viewer's side and an opposite side thereof respectively; but are not in any way intended to limit the installation site and installation orientation of the light emission display device.

Light Guide Member

The light guide member 1 may be formed from a material containing a transparent resin and a particulate light-diffusing material dispersed in the resin. The light guide member 1 scatters radial rays of light emitted from the point light sources 2 and incident on the back face, such that light is emitted from the light emission face S principally as diffused light. As a result, a viewer who observes from the front face side of the light guide member 1 does not recognize the point light sources 2 on the back face side, and perceives as if light is surface-emitted from the light emission face S of the light guide member 1.

The light guide member 1 includes a light shield structure that partitions the light emission face S into a plurality (two in the illustrated example, but may be three or more) of light emission regions A each corresponding to at least one point light source 2 immediately below the light emission face S, such that transmission of the rays of light from each light emission region to the adjacent light emission region(s) is reduced.

The planar shape of the light emission face S may be an arbitrary shape such as a square shape, a round shape, a cyclic shape, a strip shape and the like. The shape of each light emission region A is not particularly limited, but, from the perspective that the light shield structure (described later) may be simplified, a shape that is defined by partitioning the light emission face S with straight lines is preferred.

The lower limit of a vertical thickness (distance between the back surface and the front surface) of the light guide member 1 accounts for preferably 100% and more preferably 120% of the maximum value for a horizontal distance between the point light source 2 and a center of the light shield structure (distance in a direction along a face on which the point light sources 2 are arranged). Meanwhile, the upper limit of the vertical thickness of the light guide member 1 accounts for preferably 200% and more preferably 180% of the maximum value for the horizontal distance between the point light source 2 and a center of the light shield structure. When the vertical thickness of the light guide member 1 is less than the lower limit, the light emitted from the point light sources 2 may not be sufficiently diffused, and consequently variance in luminance of the light emission face S may be too large. To the contrary, when the vertical thickness of the light guide member 1 is greater than the upper limit, the light emission display device may be unduly increased in thickness, and in addition, the light emitted from the point light sources 2 may not be sufficiently transmitted and thus may result in reduced luminance of the light emission face S.

The light shield structure may be configured to have a slit 3 formed to extend from the back face side toward the front face side (upwards).

The slit 3 may be open to the front face of the light guide member 1, but is preferably formed not to be open to the front face of the light guide member 1 in order that an entirety of the light emission face S may emit light.

The slit 3 is preferably provided with a light-nontransmissive layer in order to reliably inhibit transmission of light into the adjacent light emission region A. Specifically, passage of light across the slit 3 may be prevented or inhibited by inserting a light shield plate into the slit 3 as illustrated in FIG. 1, or by applying on an inner face of the slit 3 a paint that is capable of reflecting or absorbing light. Particularly in the configuration including insertion of the light shield plate 4, production of the light emission display device is easy, while a boundary between the light emission region A being lit and the light emission region A being unlit is clearly defined, whereby display on the light emission device becomes distinct.

The lower limit of the minimum thickness T of a portion of the light guide member 1 on the front face side of the slit 3, that is the minimum thickness T of the light guide member 1 in the thickness direction at a position where the slit 3 is provided, is preferably 0.5 mm and more preferably 0.8 mm. Meanwhile, the upper limit of the minimum thickness T of the portion of the light guide member 1 on the front face side of the slit 3 is preferably 3.0 mm and more preferably 2.0 mm. In the case in which the minimum thickness T of the portion of the light guide member 1 on the front face side of the slit 3 is less than the lower limit, when the light emission regions A on both sides of the slit 3 are lit, luminance in the vicinity of the boundary thereof may be insufficient, and in addition, the light guide member 1 may be more likely to break. To the contrary, in the case in which the minimum thickness T of the portion of the light guide member 1 on the front face side of the slit 3 is greater than the upper limit, the amount of light transmitted to the adjacent light emission region A may not be sufficiently reduced, and consequently, when only one of the light emission regions A on both sides of the slit 3 is lit, the boundary of the light emission region A may be unclear.

The cross-sectional shape of the slit 3 is not limited to a shape with a substantially fixed width, and may be a triangle shape or a tapered shape in which a width of an end portion on a side of the light emission face S (front face side) or a width of the entirety of the slit 3 decreases toward the light emission face S. Particularly in the case in which the slit 3 is open to the light emission face S or in the case in which the minimum thickness T of the light guide member 1 at a position where the slit 3 is provided is small, the width of the slit 3 preferably decreases toward the light emission face S in order to make the boundary between the light emission regions A clear.

The lower limit of an average thickness of the light shield plate 4 inserted into the slit 3 (or an average distance between external surfaces of the opposite light-nontransmissive layers) is preferably 0.5 mm and more preferably 0.8 mm. Meanwhile, the upper limit of the average thickness of the light shield plate 4 or the like is preferably 3.0 mm and more preferably 2.0 mm. In the case in which the average thickness of the light shield plate 4 or the like is less than the lower limit, formation the light shield plate 4 or the like may be difficult. To the contrary, in the case in which the average thickness of the light shield plate 4 or the like is greater than the upper limit, when the light emission regions A on both sides of the slit 3 are lit, luminance in the vicinity of the boundary thereof may be insufficient.

The light guide member 1 may have on the back face a recessed part 5 that receives each point light source 2. By thus providing the recessed part 5, the light emitted from the point light source 2 may be more efficiently incorporated by the light guide member 1. The shape of the recessed part may be, for example, a spherical surface shape, a cylindrical surface shape, and the like.

The lower limit of the maximum width of the recessed part 5 is preferably twice, and more preferably three times the maximum width of the point light source 2 to be received. Meanwhile, the upper limit of the maximum width of the recessed part 5 is preferably 50%, and more preferably 40% of the center-to-center distance of the point light source 2 and the adjacent point light source 2 each to be received. When the maximum width of the recessed part 5 is less than the lower limit, the point light source 2 may not be reliably received by the recessed part 5, and consequently the light emitted from the point light source 2 may not be efficiency incorporated by the light guide member 1. To the contrary, when the maximum width of the recessed part 5 is greater than the upper limit, the recessed part 5 may overlap the adjacent recessed part 5 or the slit 3, and consequently the light emitted from the point light source 2 may not be efficiently incorporated by the light guide member 1.

The lower limit of the maximum depth of the recessed part 5 is preferably 1.0 time, and more preferably 1.5 times the maximum height of the point light source 2 to be received. Meanwhile, the upper limit of the maximum depth of the recessed part 5 is preferably 40%, and more preferably 30% of the average thickness of the light guide member 1 (without taking into consideration the slit 3 and the recessed part 5). When the maximum depth of the recessed part 5 is less than the lower limit, the recessed part 5 may not be able to receive the point light source 2, and processing accuracy and mounting accuracy may be unduly required. To the contrary, when the maximum depth of the recessed part 5 is greater than the upper limit, the effective thickness of the light guide member 1 may be insufficient, and thus may lead to a lack in uniformity of the luminance of the light emission face S.

Point Light Source

As the point light source 2, a light emitting diode, a halogen lamp, an incandescent lamp, or the like may be used, for example. Of these, a light emitting diode being small in size and superior in energy efficiency is particularly suitably used. In addition, the light emitting diode used as the point light source 2 may be a light emitting diode that emits white light or permits selection of a light color, in which elements of different wavelengths are aligned. Alternatively, the light color of the light emission region A may be made selectable by providing a plurality of point light sources 2 having different wavelengths in each light emission region A.

The plurality of point light sources 2 are preferably arranged at intervals as regular as possible. By arranging the plurality of point light sources 2 at regular intervals, a reduction in variance of the luminance of the light emission face S is enabled.

A procedure for arranging the plurality of point light sources 2 is not particularly limited, and may be, as illustrated, a procedure of mounting the plurality of point light sources 2 on a common substrate 6 and then fixing a position of the substrate 6 relative to the light guide member 1. By thus using the common substrate 6, the plurality of point light sources 2 may be arranged accurately and easily on the back face side of the light guide member 1.

Advantages

The light emission display device of the present embodiment is consisting of a small number of parts, has a simple configuration, and does not require high accuracy for a shape of each constitutive element. Accordingly, the light emission display device may be inexpensively produced.

In addition, the light emission display device is capable of emitting light from the entirety of the light emission face S by lighting all of the point light sources 2, and capable of emitting light from a certain light emission region A by selectively lighting the point light source(s) 2 in the certain light emission region A. As a matter of course, the light emission display device is also capable of not emitting light from the entirety of the light emission face S by turning off all of the point light sources 2. Therefore, the light emission display device can have at least four display modes including an unlit mode.

Furthermore, in the light emission display device, due to having the light shield structure that reduces transmission of rays of light from the light emission region A to the adjacent light emission region A, a boundary is clear between the light emission region A that emits light in which the point light source(s) 2 is lit and the light emission region A that does not emit light in which the point light source(s) 2 is unlit. Accordingly, the light emission display device enables easy discrimination of a lighting status.

Light Emission Display Switch

FIGS. 2 to 4 show a light emission display switch according to an embodiment of the present invention.

The light emission display switch 10 includes: a light emission display device 11 according to an embodiment of the present invention different from that shown in FIG. 1; an operation member 12 operable by a user; and a detection mechanism 13 that detects an operation of the operation member 12 by a user.

Light Emission Display Device

The light emission display device 11 is formed in a substantially cylindrical shape, and includes: a light guide member 1 that converts rays of incident light from one face (back face) thereof to produce diffused light and emits the diffused light from the front face; a plurality of point light sources 2 that are arranged at intervals on a side of a back face of the light guide member 1; and a plurality of light shield plates 4 inserted into a plurality of slits 3 formed in the light guide member 1. The light shield plates 4 are provided on an outer periphery of an operation member 12 (described later).

In the light emission display switch 10, unless particularly stated otherwise, configurations of the light guide member 1 (including the slit 3 and the recessed part 5), the point light sources 2 and the light shield plates 4 of the light emission display device 11 may be similar to those of the light guide member 1 (including the slit 3 and the recessed part 5), the point light sources 2 and the light shield plates 4 of the light emission display device of FIG. 1. Accordingly, constitutive elements that are identical to those of FIG. 1 are referred to with the same reference numerals and explanation thereof is omitted.

In the light emission display device 11, the light guide member 1 has a cylindrical shape having an axis in the thickness direction, and is formed in a tapered shape with a diameter gradually decreasing toward the front face side. In addition, in the light guide member 1, a radial width of the back face is greater than a radial width of the front face (light emission face S). Furthermore, the light guide member 1 has on the back face a plurality of recessed parts 5 that receive the plurality of point light sources 2 respectively. In conformity to such a light guide member 1, the plurality of point light sources 2 are circularly arranged on the substrate 6 along the back face of the light guide member 1.

The taper angle of the outer peripheral surface of the light guide member 1 is preferably such an angle that enables a center of each point light source 2 to be positioned on an outer side of the light emission face S when viewed from the front face side. By thus arranging the point light sources 2 not immediately below the light emission face, a reduction in intensity of light that travels from the point light sources 2 straight through the light guide member and then is emitted from the light emission face S is enabled. Thus, the point light sources 2 can be made less recognizable by a user. As a result, an effect of making it appear as if light is surface-emitted from the light emission face S is enhanced.

Furthermore, as illustrated in FIG. 2, when the radial width of the back face of the light guide member 1 is greater than the radial width of the light emission face S, a greater amount of light emitted from the point light sources 2 is incorporated by the light guide member 1, thereby enabling luminance of the light emission face S to be increased.

The light guide member 1 in the light emission display switch 10 of the present embodiment has two slits 3. These slits 3 partition the cyclic light emission face S into two light emission regions A1 and A2. More specifically, the cyclic light emission face S has the first light emission region A1 with one point light source 2 provided immediately therebelow, and the second light emission region A2 with four point light sources 2 provided immediately therebelow. The light emission display switch 10 is intended to indicate the functional status of a device selected by using the light emission display switch 10, according to a state in which the entirety of the light emission face S emits light and a state in which only the first light emission region A1 emits light.

The light emission display device 11 is further provided with a light shield cover 7 that covers a peripheral surface of the light guide member 1. When the light emission display device 11 is provided with the cover 7, light emitted from the point light sources 2 is prevented from leaking outside from a portion other than the light emission face S of the light guide member 1. The "portion other than the light emission face S" as referred to means, for example, a side portion of the light guide member 1.

Operation Member

The operation member 12 is provided inside the light guide member 1. Thus, the operation member 12 is formed in a frustum shape having a tapered outer peripheral surface that conforms to an outer peripheral surface of the light guide member 1, and is configured such that a user operates on a top face thereof. In addition, the light shield plates 4 are provided to protrude from the outer peripheral surface of the operation member 12.

The operation member 12 may be formed from a light shield material, integrally with the light shield plates 4.

The operation member 12 may have a light-transmissive region in a central part thereof in a planar view. In this case, by further providing the point light source 2 immediately below the light-transmissive region, light emission from the operation member 12 is enabled. The light-transmissive region of the operation member 12 may have an arbitrary design through providing a pattern in a planar view. The operation member 12 can be used as, for example, a power supply indicator that is lit when the light emission display switch 10 is turned on.

In the present embodiment, an operation on the operation member 12 as referred to means a touch by a user. In other words, the light emission display switch 10 is a touch sensor that detects a touch by a user on the operation member 12.

Detection Mechanism

The detection mechanism 13 is an electrical circuit that includes an electrode pattern 14 formed on a face of the substrate 6 facing the operation member 12, and is configured to detect a change in capacitance of the operation member 12. Accordingly, the detection mechanism 13 of the present embodiment includes an electrically conductive sponge 15 provided in a compressed state between the operation member 12 and the substrate 6, in order that the operation member 12 may be reliably connected to the electrode pattern 14.

Advantages

In response to the operation on the operation member 12, the light emission display switch 10 is capable of switching between a state in which the entirety of the light emission face S emits light uniformly and a state in which only the light emission region A1, which is a part of the light emission face S, emits light. In addition, the light emission display switch 10 enables a user to easily recognize the functional status of a device provided with the light emission display switch 10, in the case in which only the light emission region A1 emits light, due to a clear boundary thereof.

Sound Collection Device

Figure 5:
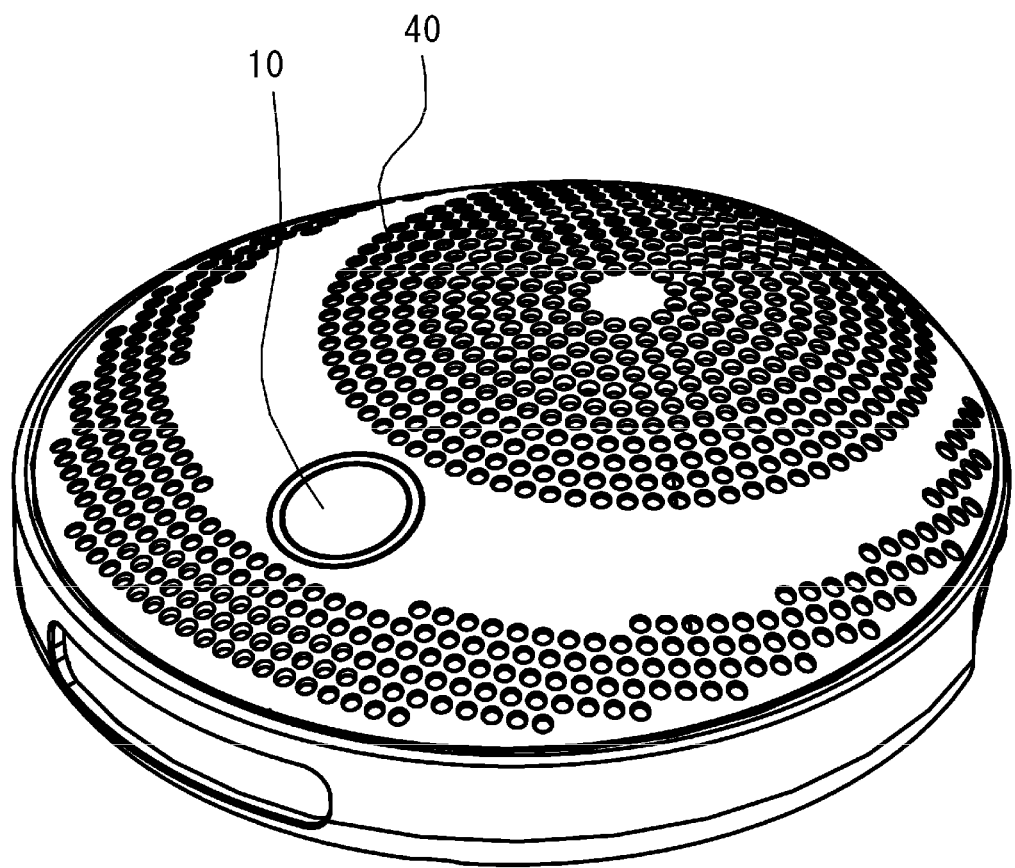
FIG. 5 is a schematic perspective view of a sound collection device provided with the light emission display switch of FIG. 2.

FIGS. 5 and 6 show a sound collection device according to an embodiment of the present invention. The sound collection device includes: the light emission display switch 10 shown in FIG. 2; and a microphone 20 whose functional status is switched in response to the operation on the light emission display switch 10. The sound collection device of the present embodiment further includes a speaker 30 and is configured to function as a teleconference terminal, in other words a voice input/output device for a teleconference system.

It is to be noted that the "functional status" of the microphone 20 as referred to means, not only a status of the function of the microphone 20 itself, but an overall status of devices related to sound collection by the microphone 20. The "status of devices" as referred to means, for example: a status of disposition of a sound-insulating member that inhibits incident sonic waves to the microphone 20; a status of setting of a signal-processing method and an amplification rate, etc. applied to sound signals output from the microphone 20 before being output from the sound collection device; and the like.

In the sound collection device, the aforementioned constitutive elements are provided inside a housing 40. The light emission face S of the light guide member 1 and a surface of the operation member 12 to be touched by a user are exposed from the housing 40 of the light emission display switch 10. The microphone 20 and the speaker 30 may be either provided behind a region on the housing 40 with openings allowing sonic waves to pass, or exposed from the housing 40.

In the sound collection device, the light emission display portion is constituted of the light emission display device 11 of the light emission display switch 10. The light emission display portion enables switching between a first display state in which an entirety of the light emission face S (first light emission region A1 and second light emission region A2) emits light, and a second display state in which a part of the light emission face S (first light emission region A1) emits light, in accordance with the functional status of the microphone 20. In other words, in the sound collection device, the light emission regions A1 and A2 each corresponding to the point light source(s) 2 to be lit is/are selected in accordance with the functional status of the microphone 20.

Microphone

The microphone 20 converts sound from an external space to electrical signals. The microphone 20 enables switching between a mute-off status in which the electrical signals are output, and a mute-on status in which the electrical signals are not output, in response to an operation on the light emission display switch 10. More specifically, switching between the aforementioned two functional status takes place when the detection mechanism 13 of the light emission display switch 10 detects the operation on the operation member 12.

As the microphone 20, arbitrary microphones such as a moving coil microphone, a ribbon microphone, a condenser microphone, and the like may be used. In the present embodiment, the microphone 20 is housed inside a device main body of the sound collection device, but may alternatively be a microphone provided to protrude from the device main body, for example a gooseneck microphone.

In addition, the microphone 20 may be directional. Also, the sound collection device may be provided with a plurality of microphones. As specific examples, the sound collection device may be provided with: a non-directional microphone 20 and a directional microphone 20; or a plurality of directional microphones 20 oriented to different directions. In the case of providing the plurality of microphones 20, the sound collection device may be configured such that a user can switch only a part of the plurality of microphones 20 into the mute-off status, through the light emission display switch 10 or other input means. The cyclic light emission face S of the light emission display portion in the light emission display switch 10 may be configured to emit light from a light emission region oriented to a direction to which the microphone 20 is in the mute-off status, that is a direction from which the microphone 20 is capable of collecting sound (outputting electrical signals).

In addition, the sound collection device may be configured such that, as the functional status of the microphone 20, intensity of the sound signals output from the microphone 20 (gain) is switchable. In this configuration, for example, luminance, color, blinking pattern, etc. of the light emission face S of the light emission display portion in the light emission display switch 10, in other words intensity, wavelength, blinking pattern, etc. of the light emitted from the point light source immediately therebelow, may be changed in accordance with the intensity of sound signals output from the microphone 20. In the case in which the sound collection device is provided with the plurality of microphones 20 capable of adjusting the intensity of the sound signals, the light emission face S is preferably configured such that each light emission region can be changed in luminance or color.

In the sound collection device, a plurality of light emission regions of the light emission face S may correspond to one microphone 20. In this case, each light emission region may emit light having luminance or a color indicating the gain of the microphone 20 in a direction corresponding to the light emission region.

Alternatively, in the sound collection device, one light emission region of the light emission face S may correspond to a plurality of microphones 20. In this case, in regard to the color and luminance of the light emission face S, the light emission face S may emit light having a color or luminance resulting from superposition of colors indicating statuses of the plurality of microphones 20. The superposition of colors may be either additive color mixing involving superposing of lights, or subtractive color mixing involving mixing of inks.

A specific example is as follows. In the case in which the sound collection device is provided with the directional microphone 20 and the non-directional microphone 20: when the non-directional microphone 20 is in the mute-off status, the entirety of the light emission face S emits light having a first color; when the directional microphone 20 is in the mute-off status, the light emission region of the light emission face S corresponding to the direction emits light having a second color; and when the non-directional microphone 20 and the directional microphone 20 are both in the mute-off status, the light emission region of the light emission face S corresponding to the directional microphone 20 emits light having a color resulting from superposition of the first color and the second color.

Furthermore, the sound collection device may involve beam forming by way of a plurality of microphones 20. In more detail, the sound collection device may be configured such that, through arithmetic processing of the sound signals output from the plurality of microphones 20, sound from a specific direction is extracted, thereby enabling a directivity angle of ultimately obtained sound signals to be reduced. Moreover, in the case of intending to obtain the sound signals having a small directivity angle, the light emission display device 11 may be configured to emit light from a light emission region in a small angular range corresponding to the small directivity angle.

Speaker

The speaker 30 is a well-known mechanism that converts electrical signals to air vibration. In the case of using the sound collection device as a voice input/output device for a teleconference system, the speaker 30 preferably has a large directivity angle, in light of providing uniform audio quality to a plurality of conference participants. In a case in which only one speaker 30 is provided, it is preferred that the speaker 30 having a large directivity angle is disposed in such a way that sound is emitted upwards.

Alternatively, the sound collection device may have a plurality of directional speakers 30 with different directions of sound emission from each other, and may be configured such that, for each speaker 30, output may be disabled or output level may be adjusted. In this case, the cyclic light emission face S of the light emission display portion in the light emission display switch 10 may be configured such that a light emission region oriented to a direction of sound emission of the speaker 30 is lit, or each light emission region emits light having luminance or a color indicating the output level of the corresponding speaker 30. Yet alternatively, the sound collection device may have a plurality of directional speakers 30 (array speaker) with substantially the same directivity (directivity may be slightly different from each other), and may be configured such that an effective directivity angle is varied through interference between the plurality of speakers 30, and a light emission region in a direction corresponding to the effective directivity angle emits light.

In the sound collection device, as illustrated in FIG. 6, the microphone 20 is disposed in a front portion thereof in order to collect sound from a front side. The speaker 30 is disposed, away from the microphone 20, on an upper face of a rear portion of the device in order to emit sound upwards. The light emission display switch 10 is disposed on the upper face of the device, between the microphone 20 and the speaker 30 in a planar view. Such a configuration enables easy operation of the light emission display switch 10, and inhibition of collection by the microphone 20 of the sound emitted from the speaker 30.

Advantages

The sound collection device enables a user to easily recognize the functional status of the microphone 20, due to being capable of emitting light selectively from the plurality of light emission regions A1 and A2, and being provided with the light emission display switch 10 having a clear boundary between the light emission regions A1 and A2.

Other Embodiments

The embodiments described above do not restrict the constituent features of the present invention. Therefore, any omission, substitution and addition of each of the constituent features of the embodiments can be made on the basis of the description of the present specification and common general technical knowledge, and such omitted, substituted and/or added features are to be construed to entirely fall under the scope of the present invention.

In the light emission display device, the light shield structure provided in the light guide member may be a structure other than the slit. The light shield structure other than the slit is exemplified by a sheet inserted into the light guide member during molding thereof, a wide groove or notch, and the like.

In the light emission display device, the light guide member may not have the recessed part that receives the point light source.

The planar shape of the light guide member in the light emission display device is arbitrary, and the number and the arrangement of the point light sources immediately below each light emission region may be selected in accordance with the shape and size of each light emission region.

The configuration of the detection mechanism in the light emission display switch is not particularly limited and may be, for example, a contact mechanism that detects movement of the operation member, a pressure detection mechanism that detects a force applied to the operation member, and the like.

In the sound collection device, the speaker is not an essential constitutive element. The sound collection device with no speaker is exemplified by a microphone device for broadcast, and the like.

The embodiment of the sound collection device with the speaker according to the present invention is not limited to the one that functions as a teleconference terminal. As a specific example, the sound collection device that functions as a smart speaker, which is connected to the Internet and capable of talking with a user by way of artificial intelligence, is a typical embodiment of the sound collection device with the speaker according to the present invention.

INDUSTRIAL APPLICABILITY

The light emission display device and the light emission display switch according to the present invention may be employed in various types of electronic devices, but may be particularly suitably employed in the sound collection device according to the present invention. In addition, the sound collection device according to the present invention may be particularly suitably employed in a teleconference system.

EXPLANATION OF THE REFERENCE SYMBOLS

1 Light guide member
2 Point light source
3 Slit
4 Light shield plate
5 Recessed part
6 Substrate
7 Cover
10 Light emission display switch
11 Light emission display device
12 Operation member
13 Detection mechanism
14 Electrode pattern
15 Electrically conductive sponge
20 Microphone
30 Speaker
40 Housing
S Light emission face
A, A1, A2 Light emission region

What is claimed is:

1. A sound collection device comprising:
a microphone; and
a light emission display portion that switches between a first display state where an entirety of a light emission face emits light, and a second display state where part of the light emission face emits light, in accordance with a functional status of the microphone.

2. The sound collection device according to claim 1, wherein the light emission display portion emits light from a portion thereof on a side from which the microphone collects sound.

3. The sound collection device according to claim 2, further comprising:

a plurality of microphones, including the microphone;

wherein a direction of sound collection is determined in accordance with sound signals obtained from the plurality of microphones having different directivity angles of sound collection, and wherein the sound signals having different directivity angles of sound collection are obtained by processing sound signals output from the plurality of microphones.

4. The sound collection device according to claim 1, further comprising a speaker.

5. The sound collection device according to claim 4, wherein the light emission display portion emits light from a portion thereof on a side from which the speaker emits sound.

6. The sound collection device according to claim 5, wherein further comprising:

a plurality of speakers, including the speaker, wherein a direction of sound emission is determined by varying directivity angles through interference between the plurality of speakers.

7. The sound collection device according to claim 4, wherein the sound collection device functions as a teleconference terminal.

8. The sound collection device according to claim 4, wherein the sound collecting device functions as a smart speaker.

* * * * *